United States Patent
Kayahara et al.

(10) Patent No.: US 6,959,718 B2
(45) Date of Patent: Nov. 1, 2005

(54) VALVE

(75) Inventors: Toshihiro Kayahara, Matsuyama (JP); Shigehiro Watanabe, Matsuyama (JP); Tomohisa Takeda, Matsuyama (JP)

(73) Assignee: Miura Co., Ltd., Ehime-ken (JP)

( * ) Notice: Subject to any disclaimer, the term of this patent is extended or adjusted under 35 U.S.C. 154(b) by 0 days.

(21) Appl. No.: 10/303,038

(22) Filed: Nov. 25, 2002

(65) Prior Publication Data

US 2003/0098074 A1 May 29, 2003

(30) Foreign Application Priority Data

Nov. 27, 2001 (JP) .......................................... 2001-361185

(51) Int. Cl.⁷ .............................................. F16K 37/00
(52) U.S. Cl. ..................... 137/15.01; 137/312; 137/557; 251/86; 251/129.15; 251/210; 251/332
(58) Field of Search ................................. 251/210, 332, 251/129.15, 86; 137/557, 516.29, 312, 15.01; 73/46

(56) References Cited

U.S. PATENT DOCUMENTS

| 3,029,835 | A | * | 4/1962 | Biello et al. ........... 137/516.29 |
| 3,344,807 | A | * | 10/1967 | Lehrer et al. ................ 137/557 |
| 3,424,427 | A | * | 1/1969 | Ruchser .................. 251/129.15 |
| 3,548,868 | A | * | 12/1970 | Mullaney ............... 137/526.29 |
| 3,789,297 | A | * | 1/1974 | Frolich ........................ 324/694 |
| 4,049,017 | A |   | 9/1977 | Jones .......................... 137/540 |
| 4,637,430 | A |   | 1/1987 | Scheffel et al. ........ 137/516.29 |
| 4,766,930 | A |   | 8/1988 | Patti ............................ 137/540 |
| 4,922,957 | A | * | 5/1990 | Johnson ................. 137/516.29 |
| 5,193,577 | A | * | 3/1993 | De Koning ............ 137/516.29 |
| 5,226,445 | A | * | 7/1993 | Surjaatmadja .............. 430/311 |
| 5,546,981 | A |   | 8/1996 | Li et al. ................. 137/543.19 |
| 5,597,009 | A |   | 1/1997 | Scherrer et al. ............ 137/375 |

* cited by examiner

Primary Examiner—A. Michael Chambers
(74) Attorney, Agent, or Firm—Birch, Stewart, Kolasch, & Birch, LLP

(57) ABSTRACT

There is provided a valve enabling complete prevention of leakage and a backflow and having durability and less noise, and further there may be implemented a valve capable of predicting the tendency of occurrence of damage on the functions of the valve before the functions of the valve are actually damaged. In a valve having a valve chamber 5 formed between a fluid inlet 2 and a fluid outlet 3, a valve element 6 disposed in the valve chamber 5 is composed of an elastic member and an inelastic member.

20 Claims, 8 Drawing Sheets

VALVE

BACKGROUND OF THE INVENTION

The present invention relates to a valve for intercepting a line of fluid.

In an apparatus using fluid, the flow of the fluid is normally controlled by using various kinds of valves. For intercepting lines of fluid, a solenoid valve is often used as a valve for controlling opening and closing of the fluid lines, while as a valve for intercepting a backflow of fluid, a check valve is provided in most cases. These valves are each selected depending on equipment for use or conditions of pipes.

For example, in the pipes for fuel system such as boilers, there is provided a valve for controlling supply of fuel. Since boiler fuel is a light fuel or a gas fuel in nature, it is necessary to take all possible measures against leakage of the boiler fuel to ensure safety. Accordingly, in order to prevent leakage of fuel, there have conventionally been made efforts including combining various types of valves and disposing a plurality of valves in series.

In a feedwater pipe for use in feedwater system for boilers and the like, there is provided a check valve for preventing the backflow of feedwater and boiler water. Since the boiler water is high in pressure and high in temperature, it is necessary to take all possible measures against the backflow of the boiler water to ensure safety. Accordingly, in order to prevent leakage in the check valve, more specifically, to prevent the backflow, there have conventionally been made efforts including combining various types of check valves and disposing a plurality of check valves in series.

Also in a valve element that comes into contact with a valve seat of each type of valve, various materials are used to prevent leakage and a backflow. For example, as the valve element, there are used an elastic member such as rubbers and a metal member (inelastic member) generally called a metal seal. The valve made only from the elastic member is low in withstanding pressure and short of durability.

In the case of using only the metal seal, there is a problem that a small dust being interposed between the valve sheet and the valve element made from an inelastic member, which is so-called dust clogging, easily damages sealing, and tends to cause leakage and a backflow. Also, if the dust clogging occurs in the valve with metal seal structure, the dust may be washed away by the next flow of fluid, which eliminates reproducibility of leakage or the backflow, thereby disturbing examination of the cause of leakage and the backflow. Further in the metal seal structure, impact at the time of closing the valve is large, and there are also problems of durability and noise.

Further, the tendency of occurrence of damage on the functions of the valve, i.e., the leakage or the backflow, is predicted by detection of the leakage and the backflow with use of pressure gauges and the like before the function of the valve are actually damaged. However, it is difficult to predict the tendency by every valve unit.

SUMMARY OF THE INVENTION

It is an object of the present invention to provide a valve enabling complete prevention of leakage and a backflow and having durability and less noise. It is further object of the present invention to provide a valve capable of predicting the tendency of occurrence of damage on the functions of the valve before the functions of the valve are actually damaged.

The present invention has been invented to accomplish the above objects. According to an aspect 1 of the present invention, a valve having a valve chamber formed between a fluid inlet and a fluid outlet comprises a valve element disposed in the valve chamber and composed of an elastic member and an inelastic member.

According to an aspect 2 of the present invention, a valve having a valve chamber formed between a fluid inlet and a fluid outlet comprises: a valve element disposed in the valve chamber and composed of an elastic member and an inelastic member; a first valve seat that comes into contact with the elastic member; and a second valve seat that comes into contact with the inelastic member.

According to an aspect 3 of the present invention, a valve having a valve chamber formed between a fluid inlet and a fluid outlet comprises: a valve element disposed in the valve chamber and composed of an elastic member and an inelastic member; a first valve seat that comes into contact with the elastic member; a second valve seat that comes into contact with the inelastic member; and a pressure relaxation chamber disposed between the first valve seat and the second valve seat.

According to an aspect 4 of the present invention, the valve further comprises pressure detection means of the pressure relaxation chamber, wherein a tendency of occurrence of damage on functions of the valve is predicted based on pressure change of the pressure relaxation chamber detected by the pressure detection means.

DETAILED DESCRIPTION OF THE PREFERRED EMBODIMENTS

Figure 1:
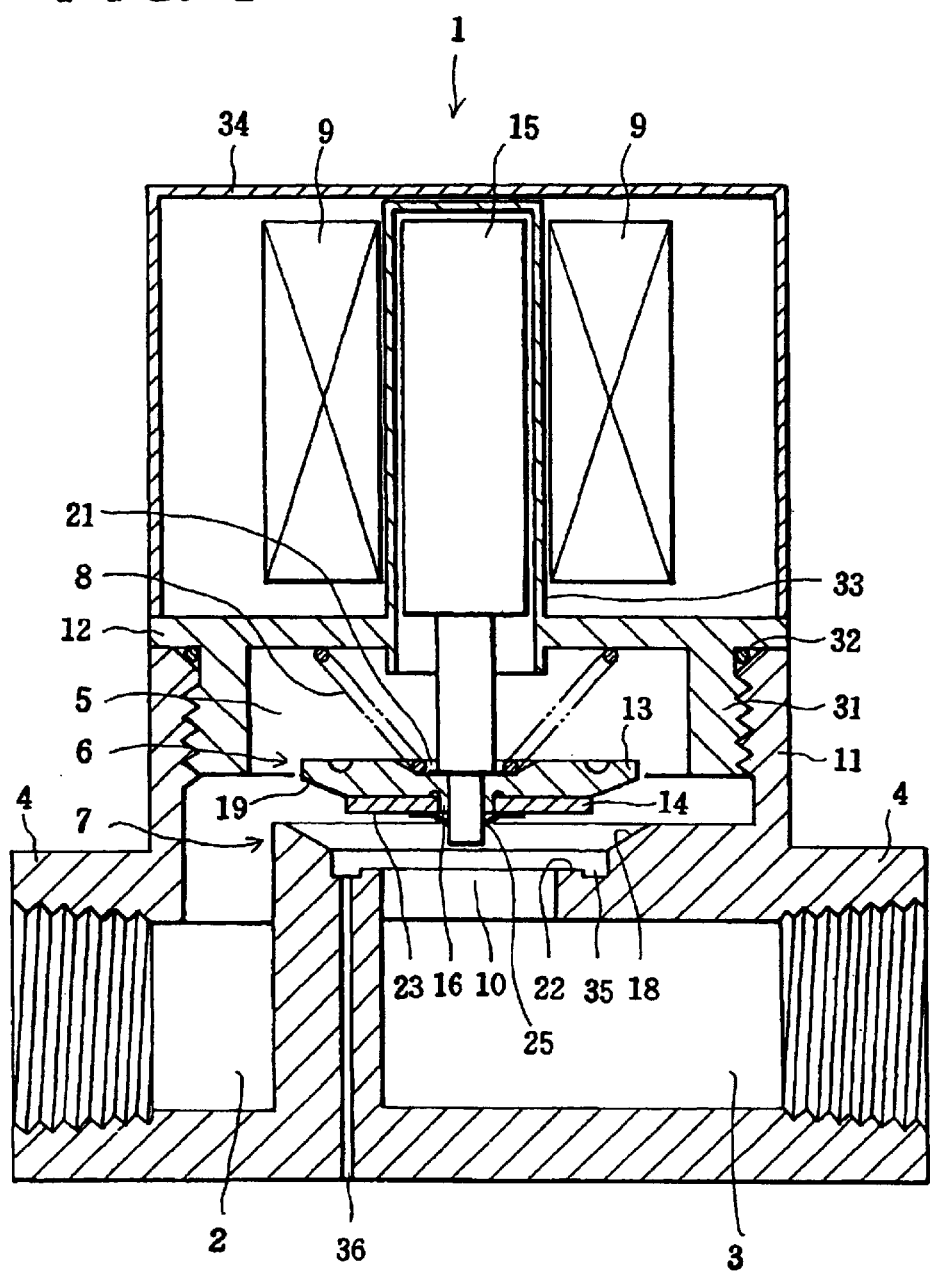
FIG. 1 is a schematic cross sectional view showing the structure of a solenoid valve in the state of opening a fluid line.

Following description discusses the embodiment of the present invention. A valve in the preferred embodiment of the present invention is applicable to an intercepting valve for intercepting a fluid line and to a check valve for intercepting a backflow of fluid.

This valve is structured such that a space portion is formed in a valve main body equipped with a fluid inlet and a fluid outlet to form a valve chamber, in which a valve element is movable.

The valve main body is formed into a cylindrical shape from an inelastic member such as metal and synthetic resin, and a valve seat that comes into contact with the valve element is provided in the valve chamber.

The valve element is composed of a disc-shaped first valve element made from an elastic member and a disc-shaped second valve element made from an inelastic member that is smaller than the first valve element. The both valve elements are fixed on a valve axis in the state of sticking to each other so as to make an integrated valve element, and structured as a valve element having the shape of a so-called top. The valve element is mounted so as to be integrated with the valve axis and movable in flow direction of fluid in the valve chamber. Further, the valve element is structured to be brought into contact with the valve seat by pressing force of a compression spring when fluid is not flowing.

Description is herein given of another embodiment of the second valve element. The second valve element, which is made from an inelastic member, may preferably be equipped with an elastic member on a contact face with the valve seat to further ensure sealing between the valve seat and the contact portion depending on application.

Description is given of still another embodiment of the second valve element. To further ensure sealing between the second valve element and the valve seat, it is preferable depending on application that the second valve element may be made from an elastic member, and a rigidity retention plate for retaining rigidity of the both valve elements may be interposed between the first valve element and the second valve element.

Next description discusses fixation of the first valve element and the second valve element on the valve axis. The first valve element is equipped with a sleeve portion provided in the central portion which is protruded to one side, and a mounting hole penetrating through the first valve element including the sleeve portion. The valve axis is inserted into the mounting hole so that the first valve element is fixed on the valve axis in the state of preventing leakage of fluid. In the central portion of the second valve element, there is provided an engagement hole that is intimately engaged with the periphery of the sleeve portion. Consequently, mounting the second valve element on the sleeve portion through the engagement hole structures the first valve element and the second valve element as an integrated valve element, and therefore the first valve element and the second valve element are fixed on the valve axis as an integrated valve element. Therefore, securing sealing between the mounting hole and the valve axis ensures prevention of fluid leakage from between the both valve elements and the valve axis.

Also, the valve seat is composed of a first valve seat that comes into contact with the first valve element and a second valve seat that comes into contact with the second valve element. Between the first valve seat and the second valve seat, there is provided a pressure relaxation chamber. The pressure relaxation chamber is for relaxing impacts caused by pressure of fluid generated when a fluid line is closed.

Description is herein given of another embodiment of the valve seat. The both valve seats, which are made from an inelastic member, may preferably be equipped with an elastic member on both contact faces with the valve elements to further ensure sealing between the valve elements and the both contact faces depending on application. Further, an elastic member is preferably mounted on the contact face of a valve seat that comes into contact with either of the valve elements.

The pressure relaxation chamber is formed in a so-called annular shape along the outer circumference of the second valve seat in the inner circumference of the first valve seat. The horizontal cross section of the pressure relaxation chamber is formed to be an approximate recess portion. The horizontal cross section may properly be formed into a semicircle shape, a triangle shape, a trapezoid shape, or the like depending on a flow rate of passing fluid. In the case where passing fluid is small in flow rate, the pressure relaxation chamber is preferably a circular space whose horizontal cross section is not in a recess shape, but just in an approximate triangle shape surrounded by the outer circumferential end portion of the second valve element, the first valve seat, and the first valve element.

Further, it is preferable to provide a pipe line connected to the pressure relaxation chamber and to provide a pressure detection means in the pipe line.

Description is given of the operation of the above-structured valve. First, the operation in the form of an intercepting valve will be described. When a fluid line of the intercepting valve is opened, the valve element is pulled away from the valve seat against the pressing force of the compression spring. This releases contact between the valve element and the both valve seats, so that fluid passes through a space in the outer circumference of the valve element and flows out from the fluid outlet. In intercepting the fluid line, the valve element is moved to the side of the both valve seats and brought into contact with them based on the pressing force of the compression spring and the fluid pressure of an inflow. First, the first valve element disposed upstream comes into contact with the first valve seat. Here, since the first valve element is an elastic member, impact noise due to the contact is small. Next, the second valve element comes into contact with the second valve seat. Then, the fluid line is doubly closed by the first valve element and the second valve element. This prevents leakage of fluid to the side of the fluid outlet.

Herein, the operation of the pressure relaxation chamber is further described in detail. In intercepting a flow of fluid, first the first valve element comes into contact with the first valve seat, so that the pressure relaxation chamber is formed together with the recess portion. Then, while the second valve element is coming into contact with the second valve seat, fluid leaks little by little to the outlet side from a space between the second valve element and the second valve seat, which gradually decreases capacity of the pressure relaxation chamber. This prevents hard collision of the second valve element with the second valve seat. More specifically, wear attributed to impact is eliminated, which increases durability and reduces impact noise.

Further, the operation of detecting pressure of the pressure relaxation chamber is described. In the pipe line connected to the pressure relaxation chamber, there is provided a pressure detection means, which detects pressure change of the pressure relaxation chamber, and determines that there is a possibility of fluid leakage when the pressure of the pressure relaxation chamber gets close to the pressure on the side of the fluid inlet. More specifically, the second valve element may prevent leakage, whereas the first valve element may determine occurrence of leakage. Accordingly, based on pressure change of the pressure relaxation chamber detected by the pressure detection means, the tendency of occurrence of damage on the functions of the interception valve, i.e., leakage of fluid, may be predicted.

Here, another pressure detection means may be provided in a pipe line connected to the fluid inlet for detecting pressure difference. When a specified pressure difference is not generated, there may be determined that there is a possibility of leakage of fluid.

Next description discusses the operation of the above-structured valve in the form of a check valve. In the check valve, at the time of direct flow, that is when fluid is supplied, the valve element is moved based on the fluid pressure of fluid coming from the fluid inlet to the side of the fluid outlet against the pressing force of the compression spring, so that the fluid flows out to the side of the fluid outlet. More particularly, movement of the valve element releases the contact between the valve element and the valve seat, so that the fluid passes through a space in the periphery of the valve element and flows out from the fluid outlet.

At the time of preventing a backflow, that is when inflow from the fluid inlet is stopped, the compressing spring returns and so the valve element moves to the side of the fluid inlet. First, the first valve element disposed downstream comes into contact with the first valve seat. Here, since the first valve element is an elastic member, impact noise due to the contact is small. Next, the second valve element comes into contact with the second valve seat. Then, the fluid line is doubly closed by the first valve element and the second valve element. This prevents a backflow of fluid from the side of the fluid outlet.

Herein, the operation of the pressure relaxation chamber is further described in detail. In intercepting a flow of fluid, first the first valve element comes into contact with the first valve seat, so that the pressure relaxation chamber is formed together with the recess portion. Then, while the second valve element is coming into contact with the second valve seat, fluid leaks little by little to the inlet side from a space between the second valve element and the second valve seat, which gradually decreases capacity of the pressure relaxation chamber. This prevents hard collision of the second valve element with the second valve seat. More specifically, durability is increased and impact noise is reduced.

Further, the operation of detecting pressure of the pressure relaxation chamber is described. In the pipe line connected to the pressure relaxation chamber, there is provided a pressure detection means, which detects pressure change of the pressure relaxation chamber to determine that there is a possibility of a backflow of fluid when the pressure of the pressure relaxation chamber gets close to the pressure on the side of the fluid outlet. More specifically, the second valve element may prevent a backflow, whereas the first valve element may determine occurrence of the backflow. Accordingly, based on pressure change of the pressure relaxation chamber detected by the pressure detection means, the tendency of occurrence of damage on the functions of the check valve, i.e., the backflow of fluid, may be predicted.

Also, another pressure detection means may be provided in a pipe line connected to the fluid inlet for detecting pressure difference. When a specified pressure difference is generated, there may be determined that there is a possibility of a backflow.

Working Example

Hereinbelow, specific working examples of the present invention will be described in detail with reference to accompanying drawings. A preferred first working example is described in the state of being applied to a solenoid valve, which is a valve for intercepting a fluid line. FIG. 1 is a schematic cross sectional view showing the structure of a solenoid valve in the state of opening a fluid line.

In FIG. 1, a solenoid valve 1 has a valve chamber 5 in a valve main body 4 equipped with a cylindrical fluid inlet 2 and a cylindrical fluid outlet 3. In the valve chamber 5, a valve element 6 is movably disposed, and a valve seat 7 that comes into contact with the valve element 6 is provided. Further, the solenoid valve 1 is composed of a compression spring 8 for bringing the valve element 6 into contact with the valve seat 7, and an electromagnetic coil 9 for pulling the valve element 6 away from the valve seat 7 against the pressing force of the compression spring 8.

The valve main body 4 forms a circular opening portion 10 in a fluid line extending from the fluid inlet 2 to the fluid outlet 3, and has a protruding portion 11 that properly protrudes to the periphery of the valve main body 4 so as to surround the opening portion 10 and to secure the fluid line extending from the fluid inlet 2 to the opening portion 10. A lid member 12 is fit into the protruding portion 11 to form the valve chamber 5. Around the opening portion 10, there is formed the valve seat 7 that comes into contact with the valve element 6.

The valve element 6 is movable in direction orthogonal to the opening portion 10 in the valve chamber 5 so as to come into contact with the valve seat 7 and to close the opening portion 10, and is provided via the lid member 12.

Figure 2:
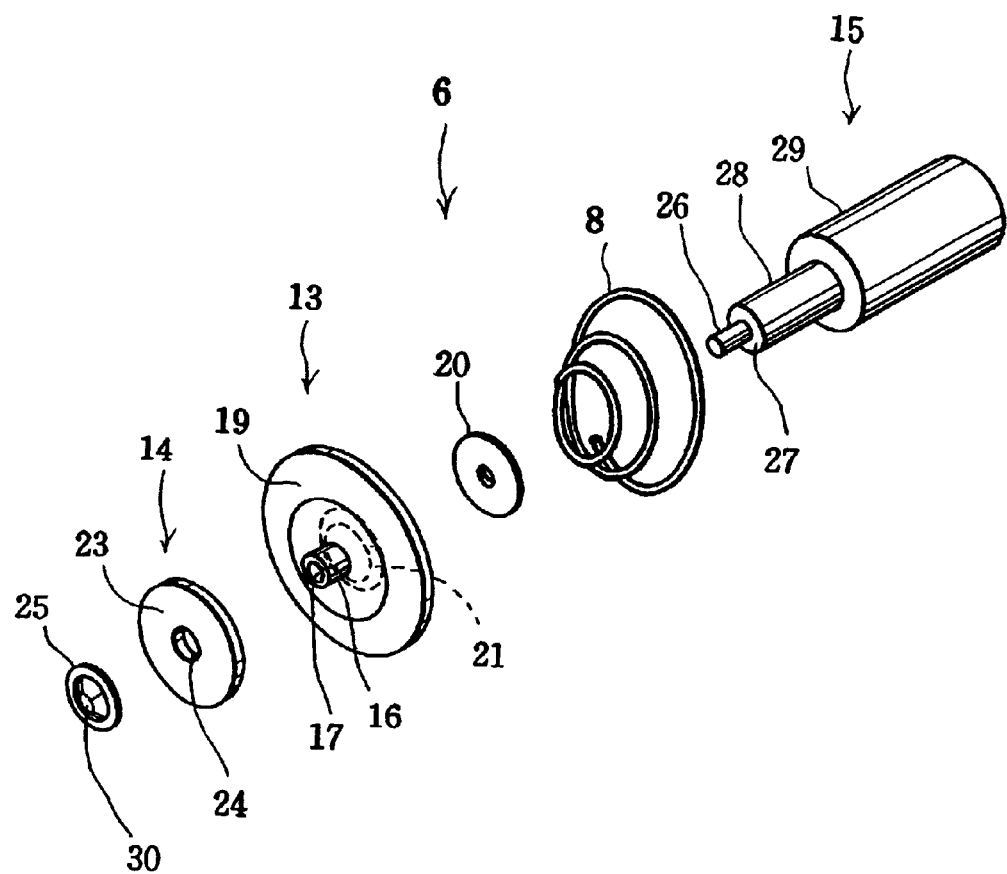
FIG. 2 is an exploded perspective view showing components of a valve element disposed in a valve chamber of the solenoid valve.

Herein, more detailed description will be given of the valve element 6 with reference to FIG. 2. FIG. 2 is an exploded perspective view showing components disposed in the valve chamber 5.

The valve element 6 is composed of a disc-shaped first valve element 13 made from elastic member and a disc-shaped second valve element 14 made from an inelastic member that is smaller than the first valve element 13. Both valve elements 13, 14 are fixed on a valve axis 15 (embodied by a valve spindle) in the state of sticking to each other so as to make an integrated valve element, and structure as a valve element having the shape of a so-called top. The valve element 6 is mounted so as to be integrated with the value axis 15 and movable in flow direction of fluid in the valve chamber 5.

Herein, more detailed description will be given of each member. The first valve element 13, which is formed by pressing an elastic material such as rubbers, is equipped with a sleeve portion 16 provided in the central portion which is integrally protruded to the side of the fluid outlet 3, and a mounting hole 17 penetrating through the first valve element 13 including the sleeve portion 16. The first valve element 13 chamfers a portion (i.e., a shoulder portion of one side of the first valve element 13) coming into contact with a contact face (a later-described first valve seat 18) of the valve seat 7 to form a conical first seal portion 19. Further, in the central portion of the first valve element 13 on the side of the fluid inlet 2, there is integrally formed a recess portion 21 for disposing a washer 20 and one end of the compression spring 8. Here, a protruding length of the sleeve portion 16 is made slightly larger than a plate thickness of the second valve element 14. The thickness of the sleeve portion 16 is set to be a proper size so that when the sleeve portion 16 is fit with the second valve element 14, the sleeve portion 16 may bring about an effect for achieving a tight fit by elastic deformation. To achieve a tight fit with the valve axis 15, the mounting hole 17 has an inner diameter formed slightly smaller than an outer diameter of a mounting portion (a later-described small diameter portion 26) of the valve axis 15.

The second valve element 14, which is formed by pressing an inelastic material such as metal, has a plate-shaped second seal portion 23 formed in a portion (i.e., a portion of one side of the second valve element 14) coming into contact with a contact face (a later-described second valve seat 22) of the valve seat 7. In the central portion of the second valve element 14, there is provided a fitting hole 24 that fits tightly with an outer circumferential face of the sleeve portion 16.

The valve axis 15 is formed into the shape of a three-stepped rod made up of a small diameter portion 26 penetrating the washer 20, the mounting hole 17, and a push nut 25, a middle diameter portion 28 having an end face 27 that comes into contact with the washer 20 in the recess portion 21, and a large diameter portion 29 that accepts the operation of the electromagnetic coil 9.

Further, the push nut 25 is equipped with a fastening hole 30 in a central portion, and the surrounding of the fastening hole 30 is a fastening device composed of a plate spring (reference symbol omitted) with elasticity. The push nut 25 fastens the both valve elements 13, 14 on the valve axis 15.

Description is herein given of the assembly of the valve element 6. The valve element 6 is integrally assembled from the valve axis 15, the washer 20, the first valve element 13, the second valve element 14, and the push nut 25.

Next description discusses assembling procedures of the valve element 6. First, the compression spring 8 and the washer 20 are penetrated by the small diameter portion 26. Next, the first valve element 13 is fit into the small diameter portion 26 via the mounting hole 17, and then the second valve element 14 is fit into the sleeve, portion 16 via the fitting hole 24. Next, the push nut 25 is fit into the small diameter portion 26 via the fastening hole 30, so that the both valve elements 13, 14, and the washer 20 are pressed to the end face 27 and fixed thereto in the state of being interposed. The push nut 25, which is fastened to the small diameter portion 26 by the force of the plate spring so as not to turn back, keeps on pressing the both valve elements 13, 14 and the washer 20 to the end face 27. Consequently, the valve element 6 is assembled into a valve element having the shape of a so-called top, and disposed in the valve chamber 5 with the compression spring 8 being disposed in the outer circumference of the middle diameter portion 28.

Description is herein given of fixing the first valve element 13 and the second valve element 14 on the valve axis 15. The small diameter portion 26 is inserted into the mounting hole 17 for fixing the valve elements 13, 14 on the valve axis 15 in the state of preventing leakage of fluid. Mounting the second valve element 14 on the sleeve portion 16 via the fitting hole 24 structures the first valve element 13 and the second valve element 14 as an integrated valve element, and as the integrated valve element, the first valve element 13 and the second valve element 14 are fixed on the valve axis 15.

Next, the valve seat 7 will be described in detail with reference to FIG. 1. The valve seat 7 is composed of a first valve seat 18 that comes into contact with the first valve element 13 and a second valve seat 22 that comes into contact with the second valve element 14. Here, the first valve seat 18 and the second valve seat 22 are formed around the opening portion 10, and the first valve seat 18 is formed outside of and upstream from the second valve seat 22. Also, the first valve seat 18 is formed to have a specified angle against the valve axis 15 so as to have a contact face with the shape of a so-called mortar. The contact face of the second valve seat 22 is formed to be orthogonal to the axis direction of the valve axis 15.

Next, the lid member 12 is composed of the protruding portion 11 and a fitting portion 31 that is fit with the protruding portion 11. In the protruding portion 11 and the fitting portion 31, the valve main body 4 and the lid member 12 are engaged with each other with a packing 32 as a seal member interposed therein, so that the valve chamber 5 is formed in the state of being sealed. The lid member 12 includes a solenoid portion 33 for accommodating the valve axis 15 and operating the electromagnetic coil 9. The solenoid portion 33 is provided in a central portion of the lid member 12 in the state of protruding toward outside. The electromagnetic coil 9 is disposed so as to surround the outer circumferential face of the solenoid portion 33. Further, on the outside of the lid member 12, there is provided a cover 34 for covering the electromagnetic coil 9 and the solenoid portion 33.

Description is herein given of a first modified example of the first working example, in which a pressure relaxation chamber 35 is provided between the first valve seat 18 and the second valve seat 22. The pressure relaxation chamber 35 is structured so as to play a role of relaxing impact caused by pressure of fluid generated when a fluid line is closed. The pressure relaxation chamber 35 is annularly formed to surround the opening portion 10, and disposed on the outer circumferential side of the second valve seat 22 and on the inner circumferential side of the first valve seat 18. The horizontal cross section of the pressure relaxation chamber 35 is formed to be an approximate recess portion.

Further, description will be given of a second modified example of the first working example, in which a means for detecting pressure inside the pressure relaxation chamber 35 is provided. A pipe line 36 connected to the pressure relaxation chamber 35 is provided so as to be connected to the outer circumferential face of the valve main body 4, and a pressure detection means (illustration omitted) is provided in the pipe line 36. Based on the pressure change of the pressure relaxation chamber 35 detected by the pressure detection means, leakage of fluid is determined.

Description is given of the operation of the above-described solenoid valve 1. When a fluid line is opened, current flows to the electromagnetic coil 9, and by this electromagnetic action, the valve element 6 is pulled away from the valve seat 7 against the pressing force of the compression spring 8. This releases contact between the valve element 6 and the valve seat 7, so that fluid passes through a space in the outer circumference of the valve element 6 and through the opening portion 10, and flows out from the fluid outlet 3.

Figure 3:
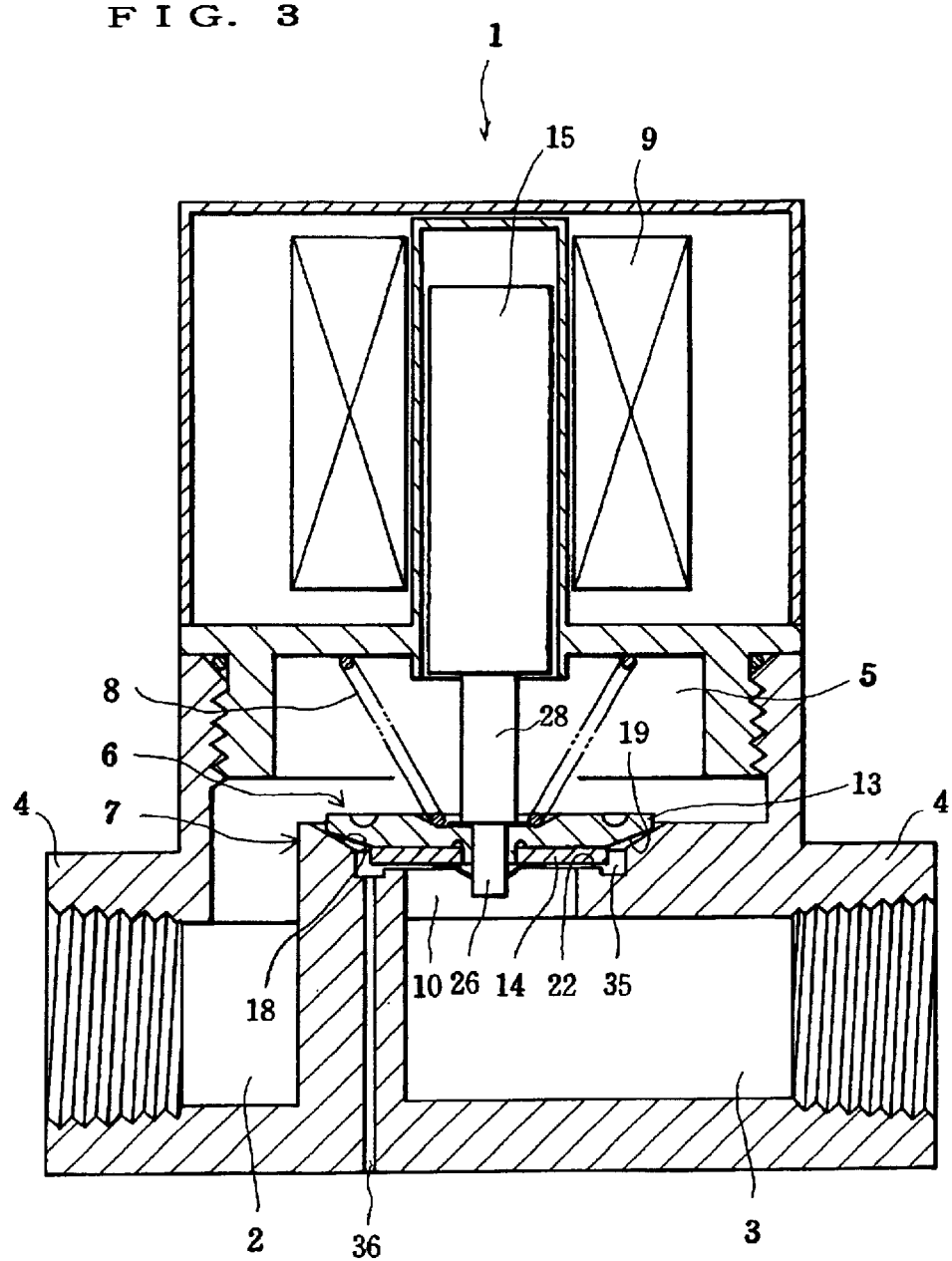
FIG. 3 is a schematic view showing the first stage in which the valve element of the solenoid valve comes into contact with a valve seat.

Also, description will be given of the case of intercepting the fluid line with reference to FIG. 3. FIG. 3 is a schematic view showing the first stage in which the valve element 6 comes into contact with the valve seat 7. In FIG. 3, terminating a current flow to the electromagnetic coil 9 moves the valve element 6 to the side of the valve seat 7 based on the pressing force of the compression spring 8 and the fluid pressure of an inflow. In connection with this movement, first, the first valve element 13 disposed upstream comes into contact with the first valve seat 18. At the time of the contact, since the first valve element 13 is formed from an elastic member, impact noise due to the contact is small.

Figure 4:
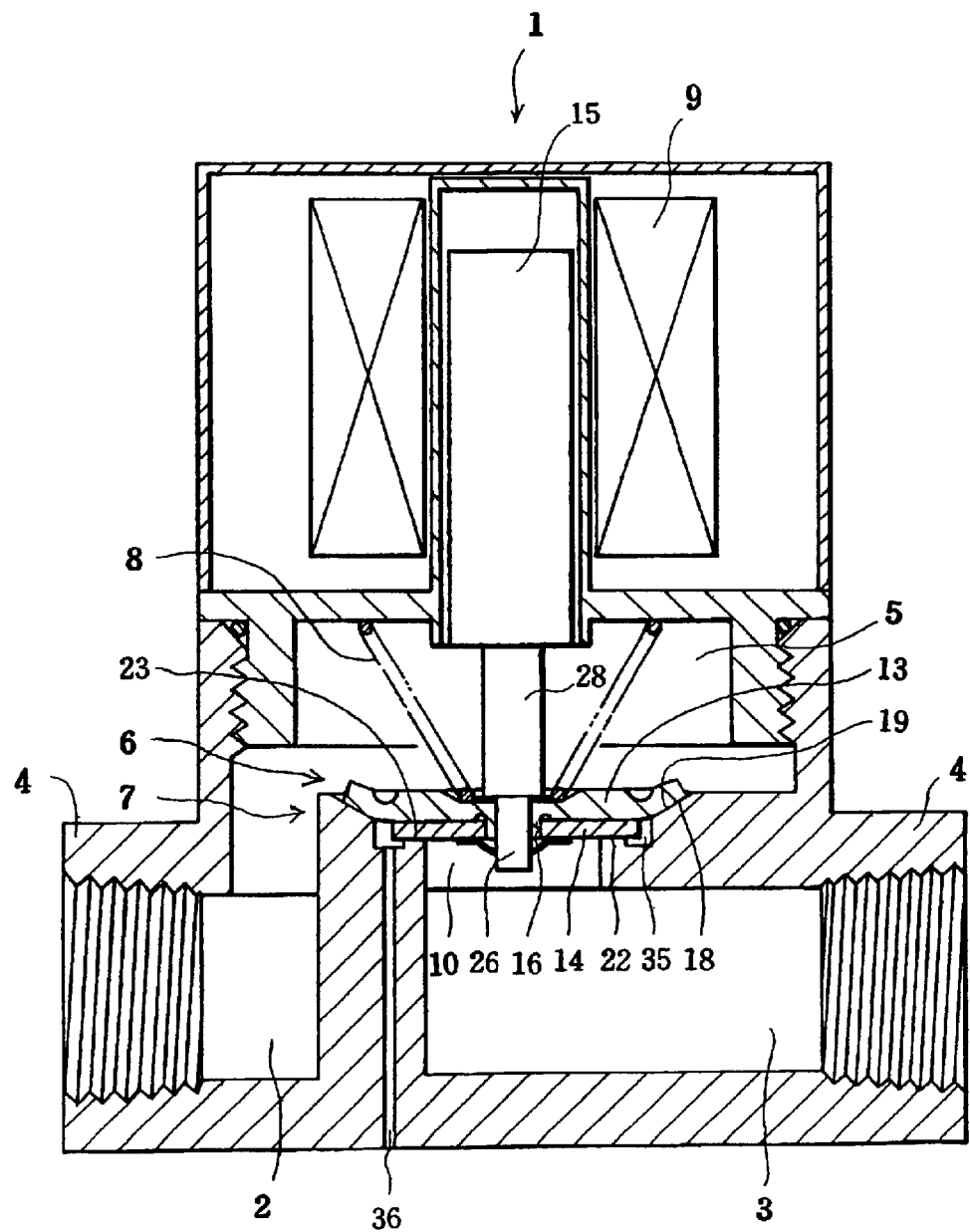
FIG. 4 is a schematic view showing the stage in which the valve element of the solenoid valve comes into full contact with the valve seat.

Next, description is given of the double interception of the fluid line with reference to FIG. 4. FIG. 4 is a schematic view showing the stage in which the valve element 6 comes into full contact with the valve seat 7. In FIG. 4, the second valve element 14 comes into contact with the second valve seat 22. At this time, the first valve element 13 is elastically deformed, which tightly fits the first seal portion 19 and the first valve seat 18. Then, the second seal portion 23 is tightly fit with the second valve seat 22. Consequently, the fluid line is doubly closed by the first valve element 13 and the second valve element 14. This prevents leakage of fluid to the side of the fluid outlet 3.

Here, leakage from the valve axis 15 is prevented by the contact of the end face 27 with the washer 20 and the first valve element 13 in the recess portion 21, and the prevention is further fully ensured by the sealing effect brought about by the elastic action of the sleeve portion 16 mounted on the small diameter portion 26.

Here, since the sleeve portion 16 is elastically deformed, a sealing effect different from the sealing effect obtained by tight fitting may be implemented. More specifically, when pressure of fluid is applied to the first valve element 13 in intercepting a fluid line, the force of deforming the first valve element 13 to the thickness direction acts to a contact face between the sleeve portion 16 and the small diameter portion 26. Consequently, the sleeve portion 16 is pressed to the side of the fluid outlet 3. However, the fitting hole 24 restrains elastic deformation of the sleeve portion 16 to the side of the fluid outlet 3, so that the whole circumferential face of the mounting hole 17 in the sleeve portion 16 is further pressed to the small diameter portion 26, which further increases the sealing effect. Therefore, the sleeve portion 16 may completely seal the leakage from the small diameter portion 26. Further, the operation of the sleeve portion 16 makes it possible to reduce the cost of the valve element 6 since specific leakage measures are not necessary.

Description is herein given of the operation of the pressure relaxation chamber 35 in the first modified example with reference to FIG. 3. In intercepting a flow of fluid, first the first valve element 13 comes into contact with the first valve seat 18, so that the pressure relaxation chamber 35 is formed together with the recess portion. Then, while the second valve element 14 is coming into contact with the second valve seat 22, fluid leaks little by little to the side of the fluid outlet 3 from a space between the second valve element 14 and the second valve seat 22, which gradually decreases capacity of the pressure relaxation chamber 35. This prevents hard collision of the second valve element 14 with the second valve seat 22. More specifically, wear attributed to impact is eliminated, which increases durability and reduces impact noise.

Further, description will be given of the operation of detecting the pressure relaxation chamber 35 in the second modified example with reference to FIG. 4. The operation is to detect pressure change of the pressure relaxation chamber 35, and determine that there is a possibility of fluid leakage when the pressure of the pressure relaxation chamber 35 gets close to the pressure on the side of the fluid inlet 2. More specifically, the second valve element 14 may prevent leakage, whereas the first valve element 13 may determine occurrence of leakage. Accordingly, based on pressure change of the pressure relaxation chamber 35 detected by the pressure detection means, the tendency of occurrence of damage on the functions of the solenoid valve 1, i.e., leakage of fluid, may be predicted.

Here, another pressure detection means (illustration omitted) may be provided in a pipe line (illustration omitted) connected to the fluid inlet 2 for detecting pressure difference. When a specified pressure difference is not generated, there may be determined that there is a possibility of leakage of fluid.

Figure 5:
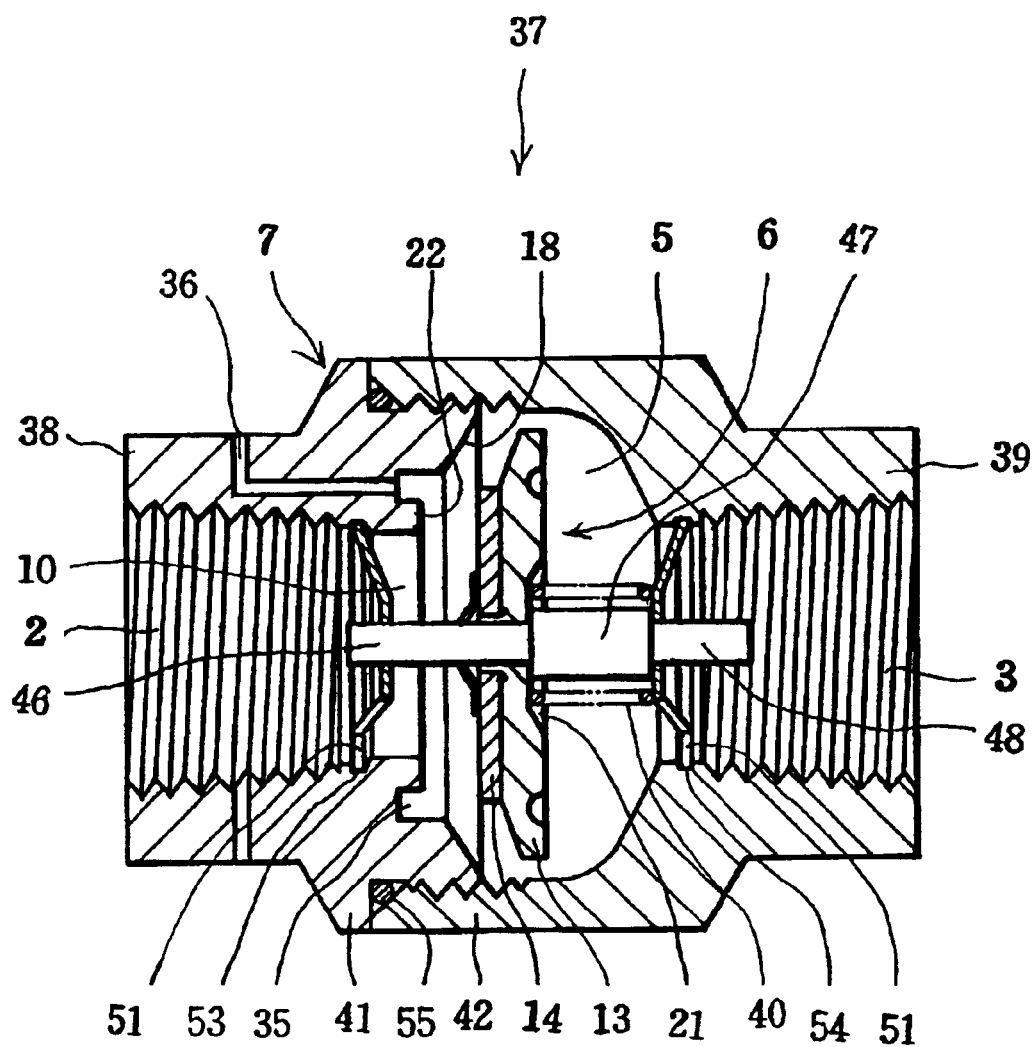
FIG. 5 is a schematic cross sectional view showing the structure of a check valve in the state of opening a fluid line.

Next, description will be given of a preferred second working example of the present invention, in which the invention is applied to an inline-type check valve. FIG. 5 is a schematic cross sectional view showing the structure of a check valve in the state of opening a fluid line. Herein, component members identical to those in the first working example are designated by identical reference numerals, and detailed description thereof will be omitted. In this second working example, the function to intercept a flow of fluid is described as a function to intercept fluid flowing in the direction opposite to the direction of the first working example, i.e., the reverse direction from the fluid outlet 3 side to the fluid inlet 2 side.

In FIG. 5, a check valve 37 has a valve chamber 5 formed by a second valve main body 38 having a cylindrical fluid inlet 2 and by a second lid member 39 having a cylindrical fluid outlet 3. In the valve chamber 5, a valve element 6 is movably disposed, and a valve seat 7 that comes into contact with the valve element 6 is provided. Further, the check valve 37 is composed of a second compression spring 40 for bringing the valve element 6 into contact with the valve seat 7.

In a fluid line extending from the fluid inlet 2 to the fluid outlet 3, the second valve main body 38 forms a circular opening portion 10 orthogonal to the fluid line, and has a main body connection portion 41 that surrounds the opening portion 10 and comes into contact with the second lid member 39. In the main body connection portion 41, the second valve main body 38 is engaged with a lid connection portion 42 provided in the second lid member 39 to form the valve chamber 5. Around the opening portion 10, there is formed the valve seat 7 that comes into contact with the valve element 6. The valve seat 7 is formed in the second valve main body 38 on the outlet side.

The valve element 6 is disposed movably in direction orthogonal to the opening portion 10 in the valve chamber 5 so as to come into contact with the valve seat 7 and to close the opening portion 10.

Figure 6:
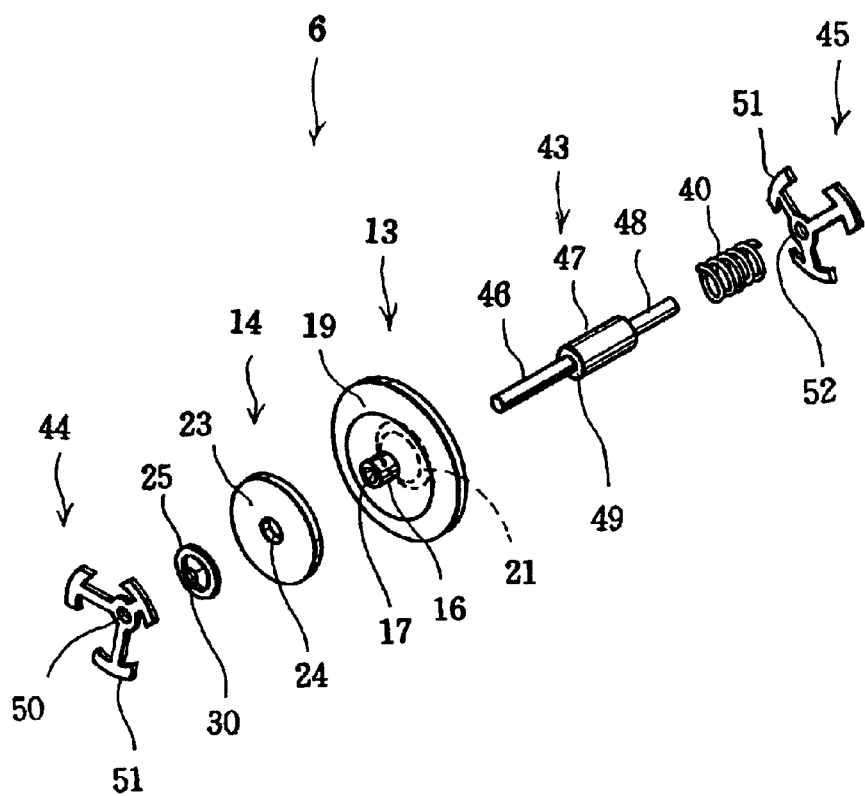
FIG. 6 is an exploded perspective view showing components of a valve element disposed in a valve chamber of the check valve.

Herein, detailed description will be given of the valve element 6 with reference to FIG. 6. FIG. 6 is an exploded perspective view showing components disposed in the valve chamber 5 in the second working example.

Similar to the first working example, the valve element 6 is formed by superposing the first valve element 13 and the second valve element 14, and a second valve axis 43 is disposed so as to penetrate a central portion of the both valve elements 13, 14 to structure a valve element having the shape of a so-called top. The valve element 6 is mounted so as to be integrated with the second valve axis 43 and movable in flow direction of fluid in the valve chamber 5. Herein, the second valve axis 43 is disposed in the fluid line with the both sides thereof being supported respectively by an inlet guide 44 and an outlet guide 45.

Here, more detailed description will be given of each member. The first valve element 13 is equipped with a sleeve portion 16 provided in the central portion which is integrally protruded to the side of the fluid inlet 2. The first valve element 13 includes a recess portion 21 integrally formed in the central portion on the side of the fluid outlet 3 in which one end of the second compression spring 40 is disposed. Herein, an inner diameter of a mounting hole 17 of the first valve element 13 is formed slightly smaller than an outer diameter of a mounting portion (a later-described inlet-side axis portion 46) of the second valve axis 43 so as to achieve a tight fit with the second valve axis 43.

The second valve axis 43 is formed into the shape of a two-stepped rod having a thick central portion, made up of a small inlet-side axis portion 46 for fastening the both valve elements 13, 14 with use of a push nut 25 and for penetrating the inlet guide 44, a middle axis portion 47 for fastening the both valve elements 13, 14 on the outlet side and for guiding the second compression spring 40, and a small outlet-side axis portion 48 for penetrating the outlet guide 45.

Description is herein given of the assembly of the valve element 6. The valve element 6 is integrally assembled from the second valve axis 43, the first valve element 13, the second valve element 14, and the push nut 25.

Next description discusses assembling procedures of the valve element 6. First, the first valve element 13 is fit into the inlet-side axis portion 46 via the mounting hole 17, and then the second valve element 14 is fit into the sleeve portion 16 via the fitting hole 24. Next, the push nut 25 is fit into the inlet-side axis portion 46 via the fastening hole 30, so that the both valve elements 13, 14 are pressed to a second end face 49 of the middle axis portion 47 and fixed thereto in the state of being interposed. The push nut 25, which is fastened to the inlet-side axis portion 46 by the force of the plate spring so as not to turn back, keeps on pressing the both valve elements 13, 14 to the second end face 49. Consequently, the valve element 6 is assembled into a valve element having the shape of a so-called top, and disposed in the valve chamber 5 by the both guides 44, 45 with the second compression spring 40 being disposed in the outer circumference of the middle axis portion 47.

Description is herein given of fixing the first valve element 13 and the second valve element 14 on the second valve axis 43. The inlet-side axis portion 46 is inserted into the mounting hole 17 for fixing the valve elements on the valve axis in the state of preventing leakage of fluid. Mounting the second valve element 14 on the sleeve portion 16 via the fitting hole 24 structures the first valve element 13 and the second valve element 14 as an integrated valve element, and as the integrated valve element, the first valve element 13 and the second valve element 14 are fixed on the second valve axis 43.

The inlet guide 44 is formed into the shape of trifurcation, and fluid passes through a space in the trifurcation. In the central portion of the inlet guide 44, there is provided an inlet-side bearing portion 50 for holding the valve element 6 in the central portion of the fluid line. In the peripheral portion thereof, a pawl portion 51 is provided in three points.

Similar to the inlet guide 44, the outlet guide 45 is formed into the shape of trifurcation, and fluid passes through a space in the trifurcation. In the central portion of the outlet guide 45, there is provided an outlet-side bearing portion 52 for holding the valve element 6 in the central portion of the fluid line. In the peripheral portion thereof, the pawl portion 51 is provided in three points.

Next, the valve seat 7 in the second working example will be described with reference to FIG. 5. Similar to the first working example, the valve seat 7 is formed around the opening portion 10, and specific structure thereof is identical to that of the first working example, and so the detailed description will be omitted here. In this second working example, the first valve seat 18 is formed downstream to the second valve seat 22.

Detailed description will be given of support of the valve element 6 by the both guides 44, 45 and assembly of the check valve 37 with reference to FIG. 5. First, in the second valve main body 38, each pawl portion 51 of the inlet guide 44 is fit into an inlet-side groove portion 53 provided on the inner circumferential face of the fluid inlet 2 and fixed thereto. Next, the valve element 6 is disposed in the valve chamber 5 with the second valve element 14 being on the side of the fluid inlet 2, and the inlet-side bearing portion 50 is penetrated by the inlet-side axis portion 46. Then, the second compression spring 40 is disposed in the periphery of the middle axis portion 47.

Next, in the second lid member 39, each pawl portion 51 of the outlet guide 45 is fit into an outlet-side groove portion 54 provided in the fluid outlet 3 and fixed thereto. While each pawl portion 51 being fixed thereto, a second packing 55 is interposed in between the lid connection portion 42 and the main body connection portion 41 to engage the lid connection portion 42 and the main body connection portion 41, and the outlet-side bearing portion 52 is penetrated by the outlet-side axis portion 48. This combines the second valve main body 38 and the second lid member 39, and assembly of the check valve 37 is thereby completed. Herein, the valve element 6 may move in direction of a flow of fluid, more specifically, to the outlet side in water feeding and to the inlet side in backward flowing. The range of movement is confined by disposition of the both guides 44, 45.

Since the structure of providing a pressure relaxation chamber 35 between the first valve seat 18 and the second valve seat 22 in a first modified example of the second working example is equal to the first working example, detailed description thereof will be omitted.

Further, since the stricture of providing a means for detecting pressure in the pressure relaxation chamber 35 in a second modified example of the second working example is equal to the first working example, detailed description thereof will be omitted. In the second working example, it is structured such that a pipe line 36 connected to the pressure relaxation chamber 35 is provided so as to be connected to the outer circumferential face of the second valve main body 38.

Next description discusses the operation of the above-structured check valve 37. Description is herein given of the case where fluid is water. In water feeding, the valve element 6 moves to a position shown in FIG. 5. Based on the water pressure of feedwater flowing from the fluid inlet 2, the valve element 6 moves to the side of the fluid outlet 3 against the pressing force of the second compression spring 40, which releases contact between the valve element 6 and the valve seat 7, so that water flows out to the side of the fluid outlet 3. More particularly, movement of the valve element 6 releases contact between the valve element 6 and the both valve seats 18, 22, by which water passes through a space in the periphery of the valve element 6 and through the opening portion 10, and flows out from the fluid outlet 3. Herein, since the second valve axis 43 is supported by the both guides 44, 45, the valve element 6 may smoothly move in direction of a flow of fluid, that is, both in direct flow direction and reverse flow direction.

Figure 7:
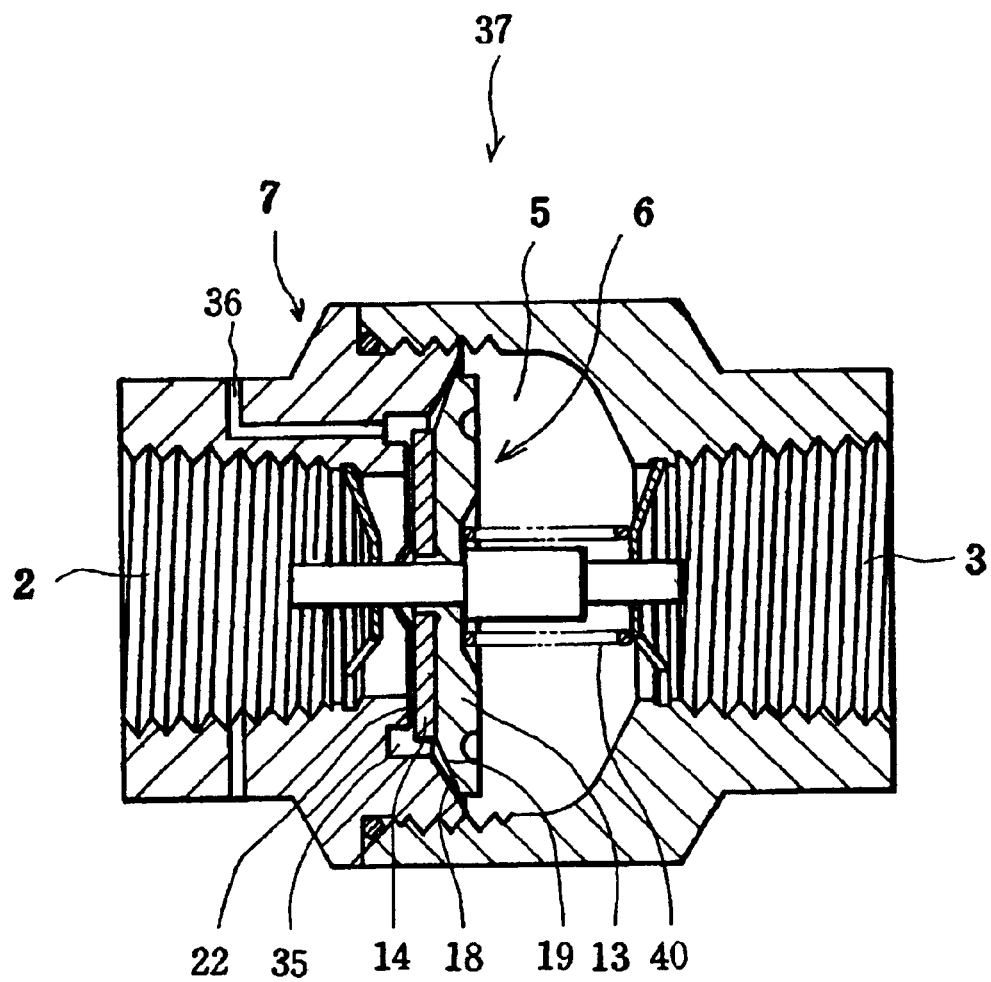
FIG. 7 is a schematic view showing the first stage in which the valve element of the check valve comes into contact with a valve seat.

Also, description will be given of the case of intercepting the fluid line with reference to FIG. 7. FIG. 7 is a schematic view showing the first stage in which the valve element 6 comes into contact with the valve seat 7, more specifically the stage when the second compression spring 40 returns and the valve element 6 moves to the fluid inlet 2. In FIG. 7, in connection with this movement, first, the first valve element 13 disposed upstream comes into contact with the first valve seat 18. At the time of the contact, since the first valve element 13 is formed from an elastic member, impact noise due to the contact is small.

Figure 8:
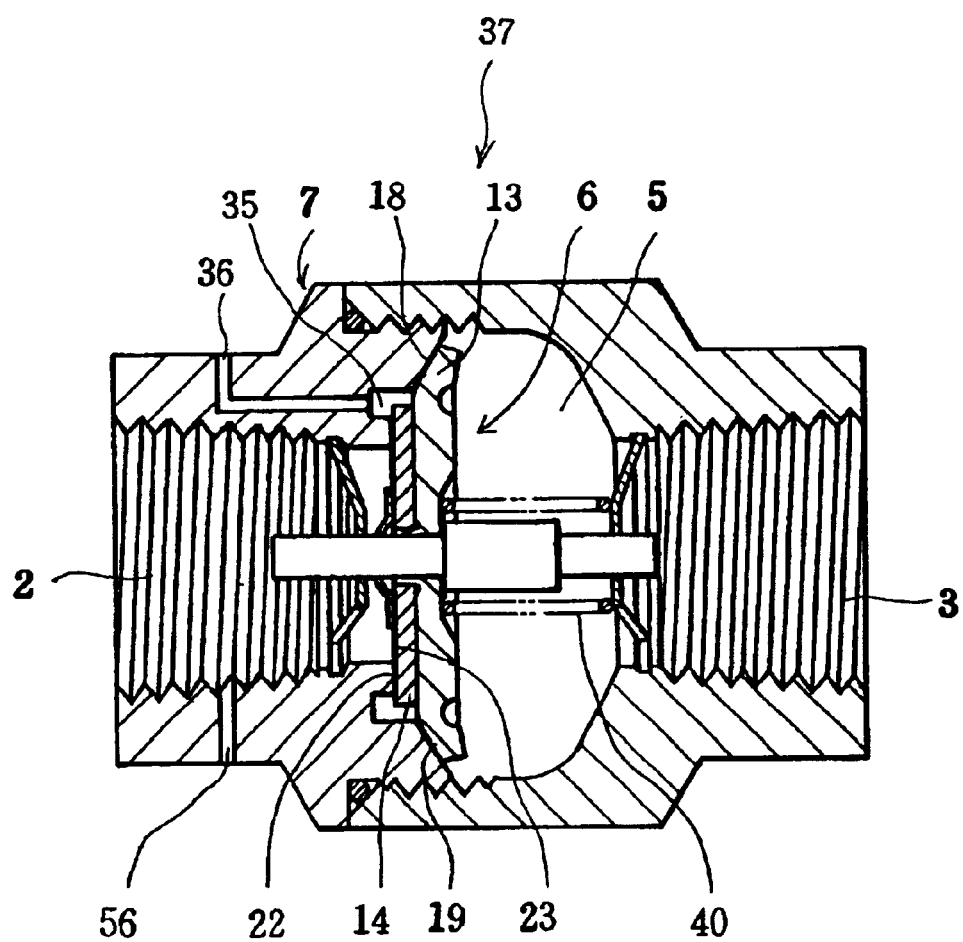
FIG. 8 is a schematic view showing the stage in which the valve element of the check valve comes into full contact with the valve seat.

Next, description is given of the double interception of the fluid line with reference to FIG. 8. FIG. 8 is a schematic view showing the stage in which the valve element 6 comes into full contact with the valve seat 7. In FIG. 8, the second valve element 14 comes into contact with the second valve seat 22. At this time, the first valve element 13 is elastically deformed, which tightly fits the first seal portion 19 and the first valve seat 18. Then, the second seal portion 23 is tightly fit with the second valve seat 22. More specifically, the valve element 6 is pressed to the both valve seats 18, 22 by the action of the second compression spring 40 and by pressure difference generated when pressure on the side of the fluid outlet 3 is higher than that on the side of the fluid inlet 2, which intercepts a backflow of feedwater from the fluid outlet 3 side. Consequently, the fluid line is doubly closed by the first valve element 13 and the second valve element 14. This prevents a backflow of fluid to the side of the fluid inlet 2.

Here, leakage from the second valve axis 43 is prevented by the contact of the second end face 49 with the first valve element 13 in the recess portion 21, and the prevention is further fully ensured by the sealing effect brought about by the elastic action of the sleeve portion 16 mounted on the inlet-side axis portion 46.

Description is herein given of the operation of the pressure relaxation chamber 35 in the first modified example of the second working example with reference to FIG. 7. In intercepting a flow of fluid, first the first valve element 13 comes into contact with the first valve seat 18, so that the pressure relaxation chamber 35 is formed together with the recess portion. Then, while the second valve element 14 is coming into contact with the second valve seat 22, fluid leaks little by little to the side of the fluid inlet 2 from a space between the second valve element 14 and the second valve seat 22, which gradually decreases capacity of the pressure relaxation chamber 35. This prevents hard collision of the second valve element 14 with the second valve seat 22. More specifically, durability is increased and impact noise is reduced.

Further, description will be given of the operation of detecting the pressure relaxation chamber 35 in the second modified example of the second working example with reference to FIG. 8. The operation is to detect pressure change of the pressure relaxation chamber 35, and determine that there is a possibility of a backflow of fluid when the pressure of the pressure relaxation chamber 35 gets close to the pressure on the side of the fluid outlet 3. More specifically, the second valve element 14 may prevent a backflow, whereas the first valve element 13 may determine occurrence of the backflow. Accordingly, based on pressure change of the pressure relaxation chamber 35 detected by the pressure detection means, the tendency of occurrence of damage on the functions of the check valve 37, i.e., a backflow of fluid, may be predicted.

Here, another pressure detection means (illustration omitted) may be provided in a second pipe line 56 connected to the fluid inlet 2 for detecting pressure difference. When a specified pressure difference is generated, there may be determined that there is a possibility of a backflow.

According to the present invention, there may be provided a valve that enables complete prevention of leakage and a backflow by double sealing of a valve seat and has durability and less noise, and further there may be implemented a valve capable of predicting the tendency of occurrence of damage on the functions of the valve before the functions of the valve are actually damaged.

What is claimed is:

1. A method for assembling a valve element for a valve, comprising the steps of:

fitting an elastic first valve element including a projecting sleeve having an outer diameter and an inner diameter onto a valve spindle having an outer diameter such that the sleeve inner diameter contacts the valve spindle outer diameter;

fitting an inelastic second valve element having an inner diameter onto the outer diameter of the sleeve; and fitting a push nut onto the valve spindle to press the first valve element and the second valve element against the valve spindle, wherein the sleeve portion sealably contacts the valve spindle.

2. The method of claim 1, wherein the step of fitting the first valve element includes inserting a small diameter portion of the valve spindle into the sleeve portion.

3. A valve having a valve chamber formed between a fluid inlet and a fluid outlet, comprising:

a valve element disposed in the valve chamber and comprising an elastic member and an inelastic member fixed on a valve spindle having an outer diameter; and a sleeve portion extending from the elastic member having an internal diameter engaging the valve spindle outer diameter and an external diameter, said inelastic member having an internal diameter portion engaging the external diameter of the sleeve, wherein the sleeve portion is elastically deformable to seal the valve spindle.

4. The valve of claim 1, further comprising:

a first valve seat that comes into contact with the elastic member; and a second valve seat that comes into contact with the inelastic member.

5. The valve of claim 4, wherein the first valve seat is formed to have a specified angle that contacts the elastic member.

6. The valve of claim 3, wherein said sleeve portion contacting both the diameter portion and a side portion of the fluid outlet to seal the valve spindle.

7. A valve having a valve chamber formed between a fluid inlet and a fluid outlet, comprising:

a valve element disposed in the valve chamber and comprising an elastic member and an inelastic member fixed on a valve spindle;

a first valve seat that comes into contact with the elastic member; and a second valve seat spaced from the first valve seat by an open annular channel that comes into contact with the inelastic member.

8. The valve of claim 7, wherein a thickness of the sleeve portion is of a size in relation to a fitting hole of the inelastic member.

9. The valve of claim 7, wherein the first valve seat is formed to have a specified angle that contacts the elastic member.

10. The valve of claim 7, wherein contact of the first valve member and the elastic member decreasing impact noise.

11. A valve having a valve chamber formed between a fluid inlet and a fluid outlet, comprising:

a valve element disposed in the valve chamber and comprising an elastic member and an inelastic member;

a first valve seat that comes into contact with the elastic member;

a second valve seat that comes into contact with the inelastic member; and an annular channel between the first valve seat and the second valve seat exposed to fluid flowing between the inlet and the outlet, wherein the first valve seat and the second valve seat lie in different planes.

12. The valve as defined in claim 11, further comprising pressure detection means, wherein a tendency of occurrence of damage on functions of the valve is predicted based on pressure change of the annular channel detected by the pressure detection means.

13. The valve of claim 11, wherein said annular channel is connected to a detector to detect pressure change within said annular channel to determine leakage of fluid from the valve spindle.

14. The valve of claim 13, further comprising a pipeline interconnecting said annular channel and said detector.

15. The valve of claim 11, wherein contact of the second valve member and the inelastic member decreases impact noise by providing at least a portion of fluid leakage into the annular channel.

16. The valve of claim 11 wherein said annular channel has an inner diameter and an outer diameter and the inelastic member has an outer diameter greater than said channel inner diameter and less than said channel cute diameter.

17. The valve of claim 16 including a passage in fluid communication with the valve chamber and having a first end in said annular channel.

18. A valve, comprising:
 a valve element, disposed in a valve chamber formed between a fluid inlet and a fluid outlet, including an elastic member and an inelastic member fixed on a valve spindle having an outer diameter;
 a first valve seat in a first plane for contacting the elastic member;
 a second valve seat in a second plane for contacting the inelastic member; and
 a sleeve portion, extending from the elastic member, having an external diameter portion engaging an internal diameter portion of the inelastic member, and having an internal diameter portion engaging the valve spindle outer diameter.

19. The valve of claim 18, wherein said internal diameter portion of the sleeve portion engages a small diameter portion of the valve spindle to seal the valve spindle.

20. The valve of claim 18, wherein said internal diameter portion of the sleeve portion engages a small diameter portion of the valve spindle to allow non-vertical movement of the valve element when moving the valve element to a closed position.

* * * * *